United States Patent [19]

Davidge et al.

[11] 3,736,055

[45] May 29, 1973

[54] REPRODUCTION APPARATUS INCORPORATING ALTERNATE REDEVELOPMENT AND REIMAGING CYCLES FOR MULTIPLE COPIES

[75] Inventors: Ronald V. Davidge; George W. Hobgood, Jr.; Carl A. Queener; Jesse W. Spears; Bernard G. Thompson, all of Lexington, Ky.

[73] Assignee: International Business Machines Corporation, Armonk, N.Y.

[22] Filed: Dec. 17, 1971

[21] Appl. No.: 209,326

[52] U.S. Cl. ....................355/14, 118/637

[51] Int. Cl. ....................G03g 15/00

[58] Field of Search ....................355/3, 14, 17; 118/637

[56] References Cited

UNITED STATES PATENTS

| | | | |
|---|---|---|---|
| 3,637,306 | 1/1972 | Cooper | 118/637 X |
| 3,614,222 | 10/1971 | Post | 355/8 |
| 3,554,640 | 1/1971 | Hoskins | 355/8 |
| 3,528,738 | 9/1970 | Hodges | 355/8 |
| 3,575,509 | 4/1971 | Suzuki | 355/8 |

*Primary Examiner*—Samuel S. Matthews
*Assistant Examiner*—Alan Mathews
*Attorney*—John W. Girvin, Jr., C. E. McTiernan and J. Jancin, Jr.

[57] ABSTRACT

A continuously operating transfer reproduction apparatus includes a cyclic control unit which automatically effects alternate redevelopment and reimaging cycles when reproducing multiple copies of the same master. An electrophotographic plate travels in a closed loop past a moving optical system which images the plate with a light image of the master creating a latent electrostatic image on the plate. The latent image is developed at a developing station and transferred to a substrate at a transfer station as the plate travels therepast. Increased throughput speed is achieved by effecting a fixed number of redevelopment cycles while the moving optical system is resetting. Thus, the plate continues its travel past the resetting optical system to the developing station where the latent image is redeveloped and thence to the transfer station for transfer of the developed image to a second substrate. The plate is then cleaned and charged prior to being reimaged with the light image of the same master, and the process continues until the requisite number of copies have been reproduced. In one embodiment, multiple imaging areas, preferably an odd number thereof, are located on the plate facilitating rapid alternate imaging and redevelopment cycles.

9 Claims, 1 Drawing Figure

PATENTED MAY 29 1973 3,736,055

Figure 1:
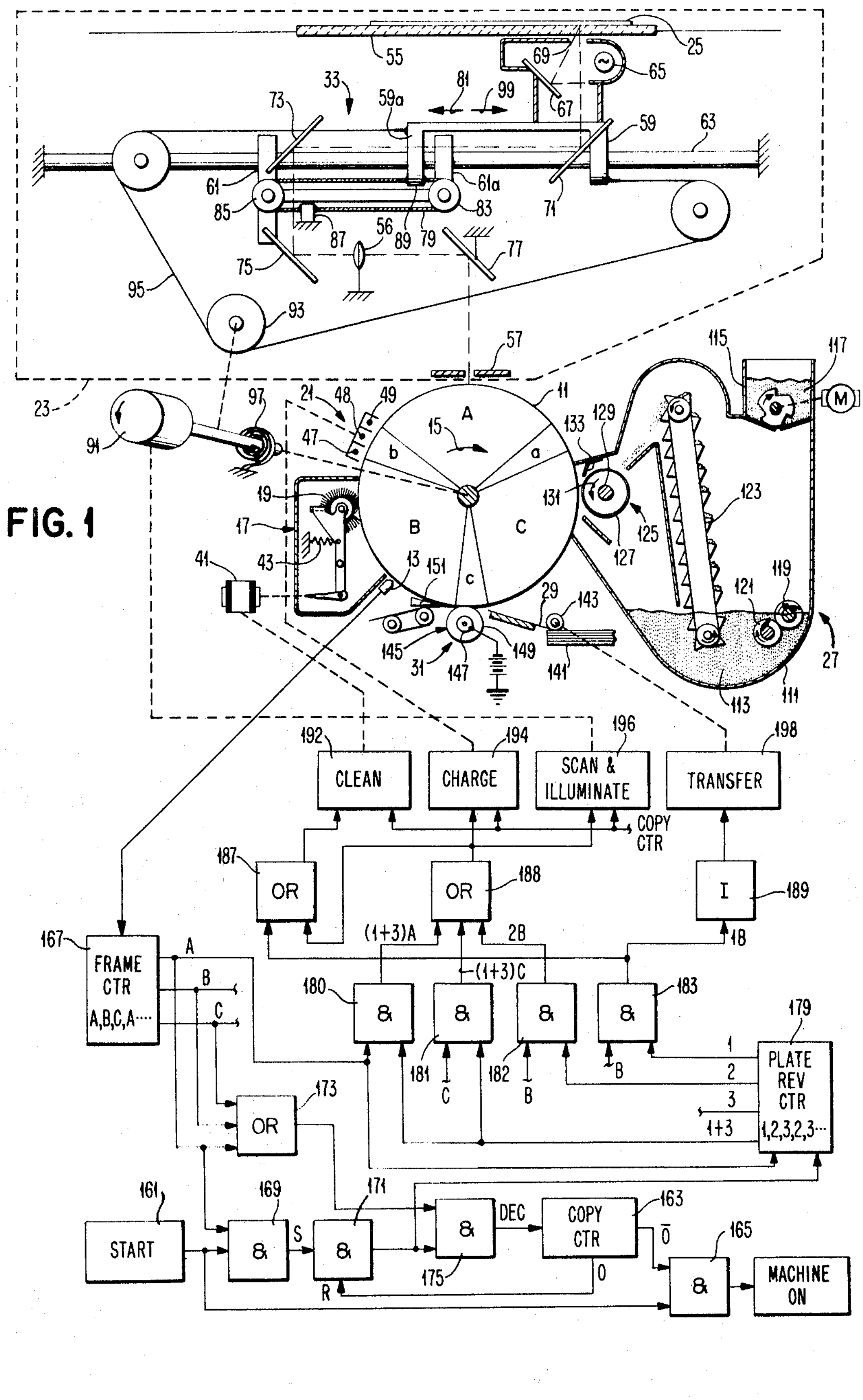

REPRODUCTION APPARATUS INCORPORATING ALTERNATE REDEVELOPMENT AND REIMAGING CYCLES FOR MULTIPLE COPIES

CROSS REFERENCE TO RELATED APPLICATIONS

The following application is assigned to the same assignee as the present application.

U. S. patent application Ser. No. 209,039 entitled "Electrophotographic Development Apparatus," Allison H. Caudill, inventor, filed Dec. 17, 1971.

BRIEF BACKGROUND OF INVENTION

1. Field

This invention relates to an electrostatic transfer reproduction apparatus and, more particularly, to an improved control device therefor for effecting rapid operation thereof.

2. Description of the Prior Art

In well-known continuous electrostatic printing processes, a photoconductive surface is continuously moved in a closed loop past various processing stations. Often, such systems include an imaging station which incorporates a moving optical projection system which projects a light image of a master onto the moving plate thereby creating a latent electrostatic image thereon. The moving optical projection system scans the master in the direction of plate travel so that the plate "sees" a continuous image of the master as it moves past the imaging station. The latent image on the plate is thereafter developed at a developing station, and the image is transferred to a substrate at a transfer station. When making multiple copies of the same master with such prior devices, it has been necessary for the system to wait for the optical system to return to its initial position prior to automatically initiating the second reproduction cycle. As devices have been constructed with ever increasing processing speeds, the delay time has accounted for a substantial portion of each reproduction cycle.

Prior attempts to avoid the delay introduced by the resetting optical projection system have suggested redeveloping the electrostatic image without reimaging the master. While such systems operate continuously without a delay thereby occasioning a marked increased in throughput, the quality of the reproduced copies rapidly degrades as the number of such redeveloped copies increase. That is, when a large number of copies are required, the first several copies produced by redeveloping the latent image without reimaging have virtually the same quality as the first copy produced by the system. However, each transfer operation and each redevelopment operation tends to degrade the electrostatic latent image on the plate thereby causing subsequent redeveloped copies to degrade in quality. Accordingly, the use of such a prior system would require operator intervention to reinitiate the system when image quality degraded below that which the operator thought was good image quality, thereby losing the time efficiencies of the redevelopment process. Accordingly no commercially successful system utilizing redevelopment has been introduced since such systems are only effective for producing a relatively small number of high quality copies of the same master.

SUMMARY

In order to overcome the above-noted shortcomings of the prior art and to provide a continuously operating electrostatic transfer reproduction apparatus having increased throughput speed when reproducing multiple copies of the same master without degrading the quality of the output copy, the present invention incorporates a cyclic control unit which automatically effects alternate redevelopment and reimaging cycles when reproducing multiple copies of the same master. In those embodiments of the invention wherein an odd number of image areas are located on the photoconductive plate, the cyclic control unit initiates alternate imaging and redevelopment cycles. Thus, a given image area on the plate is first exposed to the light image of the master by the moving optical projection system and thereafter developed. The developed image is then transferred to a substrate and the image area passes the imaging station while the optical projection system is resetting. The original electrostatic image is redeveloped and the redeveloped image transferred to produce a second copy. The image area is then cleaned and charged prior to again receiving the light image from the same master for producing a third and fourth copy. The process continues until the requistite number of copies have been reproduced. When an even number of image areas are located on the plate, the latent image is developed three times (redeveloped twice) for each image exposure. Accordingly, the number of redevelopment cycles are automatically held to a minimum thereby assuring high quality copy output. Further, no delay times are introduced by the resetting optical projection system since a redevelopment cycle is automatically taken while the optical projection system resets. Thus, both increased throughput speed and good reproduction output quality are attained without necessitating operator intervention or judgment.

Accordingly, it is the primary object of the invention to automatically increase the throughput speed of a continuously operating electrostatic transfer reproduction apparatus without causing an appreciable degradation of output image quality.

A further object of the present invention is to provide a system of this nature which rapidly reproduces a multitude of copies of the same master without noticeable variations in image quality.

The foregoing and other objects, features and advantages of the invention will be apparent from the following more particular description of the preferred embodiment of the invention as illustrated in the accompanying drawing.

In the drawings:

FIG. 1 is a schematic diagram of a continuously operating electrostatic transfer reproduction apparatus incorporating a cyclic control unit for automatically effecting alternate redevelopment and reimaging cycles.

DESCRIPTION

Referring now to FIG. 1 of the drawings, a continuously operating electrostatic transfer reproduction apparatus incorporating a cyclic control unit is depicted.

The reproduction apparatus comprises a plurality of processing stations located about a cylindrically shaped photosensitive electrostatic plate 11. The cylindrical plate comprises a layer of photoconductive material superimposed over a conductive backing. A suitable photoconductive material is disclosed in U. S. Pat. No. 3,484,237, issued Dec. 16, 1969. The cylindrical plate is divided into three segments or frames designated A, B, and C. The frames are separated from one another by interframe or intersegment gaps *a*, *b*, and *c*.

A sensing device 13 senses permanently recorded signals within the interframe gap portion of the electrostatic plate and supplies logical signals to a cyclic control apparatus to be described hereinafter indicating the positional relationship of the various frames with respect to the various processing stations, as the electrostatic plate rotates in the direction of arrow 15 past the processing stations. The electrostatic plate 11 first passes a cleaning station 17 having an actuable cleaning member 19 located therein. When actuated, the cleaning member 19 brushes the surface of the electrostatic plate 11 removing any foreign material including developer material therefrom. The plate then passes an actuable charging station consisting of a corona generating device 21 which sensitizes the electrostatic plate 11 as it rotates therepast. Thereafter, the electrostatic plate passes an imaging station 23 which, when actuated, projects a light image of a master 25 onto a frame segment of the electrostatic plate 11 rotating thereunder. The projection of the light image onto the sensitized electrostatic plate creates a latent electrostatic image thereon which rotates with the plate as it passes the developer station 27. At the developer station 27, multicomponent developer material including an electrostatically charged toner is applied to the surface of the electrostatic plate containing the electrostatic image thereon. The charged toner particles are preferentially attracted to the latent image on the plate 11 and are subsequently transferred to a substrate surface 29 at the transfer station 31.

As will be described hereinafter, the frame containing the latent electrostatic image which had been imaged at the imaging station 23 is not cleaned at the cleaning station 17 as it again rotates therepast, nor is it charged at the actuable charging station 21 as it again rotates therepast. Further, as will be described, the imaging station 23 incorporates a moving optical projection system 33 which is reset to its initial position as the previously imaged frame rotates past the imaging station 23. Since the initial latent electrostatic image remains basically in tact (it not being disturbed at the cleaning station 17 or the charging station 21 or re-exposed at the imaging station 23), the image is redeveloped at the developing station 27 and the thusly redeveloped image is transferred to a second substrate surface at the transfer station 31. Thereafter, the segment containing the image is cleaned at the cleaning station 17, charged at the charging station 21 and imaged with the same master 25 at the imaging station. The operation thus proceeds alternately imaging and redeveloping a previously imaged segment until the requisite number of copies of the master 25 have been produced.

In the description immediately following, the detailed operation of each of the processing stations located about the periphery of the electrostatic plate 11 will be described. Thereafter will follow a description of the cyclic control logic which effects the sequential operation of each of the stations as the electrostatic plate 11 rotates therepast.

The sensing device 13 senses indicia permanently recorded on the edge portion of the electrostatic plate 11 at the interframe gaps *a*, *b* and *c*. For example, this device could comprise a magnetic head adapted to read magnetic signals recorded on the edge surfacce of the plate. The output signal of this device is utilized to control the sequencing of the various stations to be described hereinafter.

The cleaning station 17 incorporates an actuable cleaning member 19 which moves from a position of close adjacency to the electrostatic plate 11 to a second position remote from the electrostatic plate 11. The cleaning member could, for example, comprise a cleaning brush well known in the art which intimately contacts the surface of the electrostatic plate 11 and rotates there against, thereby removing foreign material including toner from the surface of the plate when in its position of close adjacency thereto. The magnet and armature assembly 41 is actuated to drive the actuable cleaning member against the plate and the spring 43 returns the cleaning member to a position of nonadjacency to the plate when the magnet and armature assembly is deactuated. When in its position of nonadjacency to the plate, the actuable cleaning member 19 does not contact the surface of the plate, and therefore, the plate rotates therepast without interference therefrom.

The actuable charging station 21 comprises three corona generating wires 47, 48, and 49 which are sequentially turned on and off as the interframe gaps of the electrostatic plate 11 rotate therepast. For example, when the actuable charging station is turning on, the corona generating wire 47 is first energized as the first portion of an interframe gap rotates therepast. The corona generating wire 48 is then turned on as the same leading edge portion of the interframe gap rotates therepast, and thereafter, the corona generating wire 49 turns on as the leading edge portion of the interframe gap rotates therepast. Thus, any discontinuities in charge levels effected by turning on the corona generating wires appear within the interframe gap portions of the electrostatic plate 11. The same magnetic signal which is sensed by the sensing device 13 may also be utilized to actuate magnetically actuable switches to effect the sequential turn on and turn off of the corona generating wires 47, 48 and 49. The turn off sequence of the actuable chargingsg station is identical to the turn on sequence.

The imaging station 23 comprises a fixed transparent document mounting means 55 onto which the master 25 to be copied is placed. A moving optical projection system 33 projects a progressive light image of the master 25 through the stationary lens 56 and aperture member 57 onto the electrostatic plate 11 rotating therepast. The moving optical projection system 33 includes a first carriage 59 and a second carriage 61, both mounted in telescope fashion on a common track means 63 for reciprocal movement. The first carriage 59 supports a lamp 64 and mirror 67 which direct light upon the master 25 through the slot 69 and document mounting means 55 to thereby illuminate a segmental portion of the master 25. A scanning mirror 71 is also mounted on the first carriage 59 for receiving the image of the master thus illuminated.

The second carriage 61 supports a pair of compensating mirrors 73 and 75 which receive the image as reflected by the scanning mirror 71 and redirect the image to the stationary mirror 77 through the stationary lens 56 from whence the image is reflected through the stationary aperture member 57 onto the moving electrostatic plate 11. The first carriage 59 and the second carriage 61 are mechanically interconnected through a closed loop flexible cable 79 to cause the movement of the second carriage 61 to be one-half of that of the first carriage 59. By thusly moving the second carriage 61 by an amount equal to one-half the distance moved by the first carriage 59, a constant optical path from the document mounting means 55 through the mirrors 71, 73, and 75 to the lens 56, mirror 77 to the electrostatic plate 11 is maintained during the motion of the first carriage 59, and the second carriage 61 in the scanning direction of arrow 81. The flexible cable 79 is mounted on rollers 83 and 85 carried by the second carriage 61. A ground clamp 87 makes one point on the flexible cable 79 stationary at all times. The first carriage 59 is connected to an intermediate point of the cable 79 at point 89.

The motion in the scanning direction of arrow 81 is imparted to the first carriage 59 by the actuable drive motor 91 which is connected to the capstan 93 which is in turn connectee to the cable system 95. As described heretofore, motion of the first carriage 59 in the direction of arrow 81 effects motion of the second carriage 61 through the flexible cable 79 so that the second carriage moves one-half the distance of movement of the first carriage. Upon completion of motion in the scanning direction of arrow 81, the first carriage 59 and the second carriage 61 are returned to their initial home positions by the spring motor 97 which effects rotation of the capstan 93 in an opposite direction thereby causing the cable system 95 to mvoe the first carriage 59 in the direction of arrow 99. The second carriage 61 is returned by the action of member 59a of the first carriage 59 pulling the member 61a of the carriage 61 to its home position.

Summarizing, the scanning mirror 71 and an illumination system including lamp 65, mirror 67, and slot 69 are driven by the capstan 93 in synchronism with the rotation of the electrostatic plate 11. As the scanning mirror 71 approaches the compensating mirror 73 thus tending to shorten the optical path, the compensating mirror 73 retreats at one-half the speed of the scanning mirror 71. Additionally, the compensating mirror 75 also moves with the compensating mirror 73 thereby creating a folded optical path which compensates for the tendency to shorten the optical path and maintains a constant optical path during the scanning operation. Accordingly, a light image of the master 25 is progressively projected onto a frame of the electrostatic plate 11 rotating past the aperture 57 creating a latent electrostatic image thereon. Once a complete frame section has been exposed, the lamp 64 is turned off and the first carriage 59 and the second carriage 61 are then driven to their home position under the control of the cable system 95. During the time that the optical system is returning and awaiting a new scan cycle, the next frame of the electrostatic plate 11 rotates past the aperture 57.

As the electrostatic plate 11 passes the developer station 27, electrostatically charged toner is applied thereto thereby developing the latent electrostatic image existing on the surface of the electrostatic plate 11.

The operation of the developer station 27 is generally described in the aforereferenced copending application of Allison H. Caudill. The developer station includes a sump portion 111 containing multicomponent developer material 33. The principle components of the developer material are electroscopic toner and a carrier material. Suitable materials for use as toners are well known in the art and generally comprise finely divided resinous materials capable of being attracted and held by electrical charges. Many well-known suitable carrier materials can be utilized, the carrier particles generally being between 50 and 1,000 microns in size. The carrier materials which are utilized for the developer station depicted must be ferromagnetic or capable of being attracted and held by a magnetic field. Such a carrier material could comprise a magnetic bead coated with a material which triboelectrically interacts with the selected toner to produce a desired charge on the toner in order to provide good imaging quality.

A toner dispensing unit 115 is provided to dispense toner particles 117 into the multicomponent developer material 113 located in the sump portion 111 of the developer station 27. Counterrotating augers 119 and 121 stir the freshly added toner with developer material to assure complete mixing thereof.

A bucket conveyor 123 rotates through the sump portion 111 of the developer station 27 and scoops up quantities of developer material 113 for delivery to the magnetic brush unit 125. The magnetic brush unit includes a conductive, nonmagnetic, rotatable, cylindrical member 127 having located therein a magnetic field producing means 129. Since the core material of the carrier particles consists of a ferromagnetic material the carrier particles are caused to be magnetically attracted to the surface of the cylindrical member 127 and held thereon by magnetic forces produced by the magnetic field producing means 129. The cylindrical member 127 rotates in the direction of arrow 131 under a doctor blade 133 which governs the amount of developer material located on the surface of the cylindrical member 127 as it rotates to a position adjacent the electrostatic plate 11. As described in the aforereferenced copending application of Allison H. Caudill, the magnetic field producing means 129 creates a normal magnetic field at approximately the 9 o'clock position of the cylindrical member 127 causing the magnetic carrier particles in the developer material 113 to form in bristle-like arrays emanating from the surface of the cylindrical member 127.

The small toner particles of the developer material 113 are held onto the surface of the relatively large carrier particles by electrostatic forces, which develop from the contact between the toner and the outer surface of the carrier particles which produces triboelectric charging of the toner and carrier material to opposite polarities. A potential source (not shown) is connected to the cylindrical member 127 thereby biasing the cylindrical member to a fixed potential. As the magnetically formed bristles of carrier material containing toner triboelectrically attracted thereto rotate past and in contact with the electrostatic plate 11, the triboelectrically charged toner particles are attracted to the electrostatic latent image on the plate 11 and adhere thereto. The potential on the cylindrical member correctly orients the electrical field in which the charged toner particles move to produce a uniformly developed image on the surface of the plate 11. The electrostatic plate 11 containing a toned or developed image continues its rotational movement past the developer station 27 and continues to the transfer station 31. The carrier particles and the unspent toner particles attracted thereto are retained on the surface of the cylindrical member 127 until it reaches its approximate 6 o'clock position whereupon they are released into the sump portion 111 for subsequent mixing and reuse.

As the developed image on the electrostatic plate 11 moves from the developer station 27 toward the transfer station 31, a substrate surface such as paper is fed from the hopper 141 by the picker roll 143 which is actuated in timed relation to the rotational movement of the electrostatic plate 11.

The substrate surface 29 is fed over a feed path to the transfer roller 145. The transfer roller comprises a conductive core 147 and a dielectric outer layer 149. The conductive roll is biased so that the positively charged toner particles will separate from the electrostatic plate 11 and transfer to the support substrate 29. That is, an electric field is created between the grounded conductive backing member of the electrostatic plate 11 and the biased core 147 through the photoconductive surface of the electrostatic plate 11 and the insulating material 149 of the transfer roller 145. The toner particles move within this field to the support substrate 29 located between the electrostatic plate 11 and the transfer roller 145. Thereafter, the support substrate is removed from the surface of the electrostatic plate 11 by the pickoff means 151. The pickoff means 151 can comprise any of the well-known pickoff devices utilized in the duplicator art such as timed air puffs, stationary guide members, or movable guide members. The thusly separated substrate surface 29 containing a toned image is thereafter transported to a fuser station (not shown) where the toner is fused to the substrate in a well-known manner.

The description immediately preceding has related to the operation of each of the processing stations located about the rotating electrostatic plate 11. As described heretofore, various ones of these stations are sequentially actuated in accordance with the positional rotational relationship of the electrostatic plate 11 with respect to the fixed sensing device 13. The sequential actuation of the various stations facilitates alternate imaging and redevelopment cycles. By utilizing such alternate imaging and redevelopment cycles, the throughput speed of the reproduction apparatus is increased since there is no longer a requisite delay time occasioned by the moving optical projection system 33 which must reset to an initial condition. Further, by limiting the number of redevelopment cycles, high quality output images are maintained.

When utilizing an electrostatic plate having three segments such as that depicted in FIG. 1 of the drawings, alternate segments are first imaged on the first rotation of the electrostatic plate and the electrostatic latent images created thereby are not thereafter substantially altered, thus allowing the latent image to be redeveloped on the second revolution of the electrostatic plate. The cleaning member and the charging station are actuated prior to imaging cycles and deactuated prior to redevelopment cycles. The following table summarizes the cyclic operation of the cleaning, charging, imaging, and transfer stations.

TABLE I

| Plate Rev. | Frame | Clean | Charge | Image | Transfer |
|---|---|---|---|---|---|
| 1 | A | Yes | Yes | Scan (image) | Yes |
| | B | Yes | No | Return (no image) | No |
| | C | Yes | Yes | Scan (image) | Yes |
| 2 | A | No | No | Return (no image) | Yes |
| | B | Yes | Yes | Scan (image) | Yes |
| | C | No | No | Return (no image) | Yes |
| 3 | A | Yes | Same as Rev. 1 | Same as Rev. 1 | Yes |
| | B | No | | | Yes |
| | C | Yes | | | Yes |
| 4 | A B C | Same as Rev. 2 | Same as Rev. 2 | Same as Rev. 2 | Same as Rev. 2 |

As can be seen from Table I, the operation on all even numbered plate revolutions is the same. After the first plate revolution, the operation of the device is the same for all odd-numbered plate revolutions, the only difference between plate revolutions 1 and 3 being the operation of the cleaning and transfer stations with respect to the B segment which does not go through a redevelopment cycle on the first plate revolution.

Referring once again to FIG. 1 of the drawings, the machine logic which effects the cyclic operation of the cleaning, charging, imaging and transfer stations is depicted in block form. The reproduction apparatus is started upon operator depression of a start control 161. The operator also sets a copy counter 163 indicating the number of reproductions of the master 25 which are desired. Assuming that a number of copies is specified, the copy counter 163 provides an output signal to the And gate 165 which provides a machine on signal. The machine on signal initiates the rotational movement of the electrostatic plate 11 in the direction of arrow 15 and initiates the various processing stations in a well-known manner (e.g., the bucket conveyor 123 is rotated). When the indicia located in the interframe gap, *a*, of the rotating electrostatic plate 11 is sensed by the sensing device 13, the frame counter 167 provides an output signal to the And gate 169 which, in turn, sets latch 171. The frame counter 167 also provides an output signal to the Or gate 173 upon sensing the indicia located in the interframe gaps *a*, *b*, and *c* as they rotate past the sensing device 13. The output signal of the Or gate 173 and of the latch 171 are provided to the And gate 175 which, in turn, provides a signal to the copy counter 163 causing that counter to be decremented. Thus, the copy counter is decremented as each segment rotates past the sensing device 13. It should be noted that the copy counter is initially set with a number which exceeds the number specified by the operator by four. This is to insure that the first rotaional pass of segment B, which produces no copy, is not counted and that the last counted segment rotates fully around to the transfer position. Thus, when the copy counter reaches a count of zero, the requisite number of copies have been reproduced and the machine is cycled off. It should further be noted that the output signal of the copy counter is utilized to prevent charging and scanning during the runout of the last copy.

The frame counter 167 also provides an output to the plate revolution counter 179 each time the interframe segment, a, passes the sensing device 13. The plate revolution counter provides an output signal indicating whether the electrostatic plate is in its first revolution past the sensing device 13 and, thereafter, whether the plate is in an even or odd-numbered revolution. The output signals of the plate revolution counter 179 and of the frame counter 167 are applied to the And gates 180-183 which, in turn, are applied to the Or gates 187 and 188 and the invertor 189. The output signal of the Or gate 187 is applied to the cleaning control 192. The cleaning control 192 is further provided with an input signal (not shown) indicating the precise rotational relationship of the electrostatic plate 11 with respect to the cleaning station 17. As a segment of the plate to be cleaned rotates past the actuable cleaning member 19, cleaning control 192 provides a signal to the magnet and armature assembly 41 causing the cleaning member to contact the electrostatic plate 11. The signal remains on until the entire segment has passed the cleaning member at which time the output signal of the cleaning control 192 is removed.

In a similar manner, the output signal of the Or gate 188 is provided to the charge control 194 which is also supplied with a timing signal (not shown) indicating the exact positional relationship of the interframe segment with respect to the actuable charging station 21. The charge control provides an output signal which effects the turn on or turn off of the corona generating wires 47, 48, 49 as the interframe segment rotates therepast.

The output signal of the Or gate 188 is also provided to the scan and illuminate control 196. This control is also provided with a timing signal indicating the exact positional relationship of the rotating electrostatic plate past the imaging station 23. The output signal of this device is supplied to the drive motor 91 which effects movement of the moving optical system in the scanning direction of arrow 81. Additionally, the output signal of the scan and illuminate control turns on th lamp 65 thereby illuminating the master 25. At the completion of a scan, the output signal of the scan and illuminate control is dropped, thereby causing the lamp 65 to be extinguished and the enabling signal to be removed from the drive motor 91. The spring motor 97 effects the return of the moving optical projection system 33 in the direction of arrow 99.

The Invertor 189 provides an output signal to the transfer control 198 which is also provided with a signal indicating the positional relationship of the electrostatic plate 11 with respect to the transfer station 31. The output signal of the transfer control 198 effects the rotational operation of the picker roller 143, thereby causing a substrate surface 29 to be fed from the hopper 141 in time relationship to the arrival of a developed image at the transfer station 31.

As described heretofore, the copy counter 163 provides a signal to the charge control 192 and to the scan and illuminate control 194 preventing, respectively, the charging and scanning of unwanted segments during a runout cycle. The same signal is provided to the cleaning control 192 which effects cleaning of those segments which rotate past the cleaning station during a runout cycle.

It should be noted that the timing signals indicating the exact positional relationship of the electrostatic plate 11 with respect to the various stations supplied to the cleaning control 192, the charge control 194, the scan and illuminate control 196, and the transfer control 198 may be provided by sensing devices similar to the sensing device 13 located at each station or by logic responsive to the sensing device 13 or by mechanical logic (e.g., cams, etc.) well known in the art. Further, the output signal of the cleaning control 192 may be held on through an appropriate electronic delay device or by a mechanical delay. Additionally, the charge control is depicted as being responsive to logic which turns on the actuable charging station 21. It should be noted that the absence of a signal from the Or gate 188 effects the turn off of the actuable charging station as an appropriate interframe segment passes thereunder.

While the above description has related to a three segment electrostatic plate, it is, of course, recognized that a single segment plate could be utilized. In such an embodiment, the moving optical projection system would be actuated during a first revolution of the rotating plate and would return to its home position as the plate rotated past the imaging station during its second revolution. The cleaning member and the charging station would be deactuated during the second pass of the plate therepast in order to facilitate redevelopment of the original image.

It should be further recognized that an even number of segments can be utilized by effecting two redevelopment cycles for every imaging cycle. Table II, set forth below, indicates the sequential operation of the various stations for a two-segment electrostatic plate.

TABLE II

| Drum Rev. | Frame | Clean | Charge | Image | Transfer |
|---|---|---|---|---|---|
| 1 | A | Yes | Yes | Scan (image) | Yes |
| | B | Yes | No | Return (no image) | No |
| 2 | A | No | No | Stationary (no image) | Yes |
| | B | Yes | Yes | Scan (image) | Yes |
| 3 | A | No | No | Return (no image) | Yes |
| | B | No | No | Stationary (no image) | Yes |
| 4 | A | Yes | Yes | Scan (image) | Yes |
| | B | No | No | Return (no image) | Yes |

From the above table, it can be seen that the moving optical projection system remains stationary every third imaging cycle thereby allowing a second redevelopment of a previously exposed latent image. The operation of the reproduction apparatus for drum revolutions 5–7 would be identical to drum revolutions 2–4 and so on.

OPERATION OF THE INVENTION

Referring once again to FIG. 1 of the drawings, an operator places a master 25 onto the document mounting means 55 and specificies a number of copies of the master to be reproduced by setting the copy counter 163. Thereafter, the operator depresses a start control 161 which gates the And gate 165 which in turn effects the rotational motion of the electrostatic plate 11 in the direction of arrow 15. As the interframe segment, a, passes the sensing station 13, the frame counter 167 provides an output signal effecting the decrementing of the copy counter 163 and effecting the resetting of the plate revolution counter 179. The output signals of the frame counter 167 and the plate revolution counter 179 are provided to combinational gating circuits which in turn provide signals to the cleaning control 192, the charge control 194, the scan and illuminate control 196, and the transfer control 198. These units, respectively, control the sequential operation of the cleaning station 17, the actuable charging station 21, the imaging station 23, and the transfer staion 31. Additionally, the developer station 27 is actuated to provide a continuous flow of developer material 113 to the magnetic brush unit 125 which is continuously operated to develop electrostatic latent images on the surface of the electrostatic plate 11 as the plate rotates adjacent to the cylindrical member 27.

After the interframe segment, *a*, passes the sensing device 13, it thereafter passes an actuable cleaning member 19 which is actuated by the cleaning control 192 to a position of close adjacency to the surface of the electrostatic plate 11. Thereafter, as the segment A passes the actuable cleaning member 19, residual toner existing thereon is swept therefrom.

As the interframe sector, *a*, passes the actuable charging station 21, the magnetic indicia located thereon sequentially actuates the corona generating wires 47, 48 and 49 so that the charging station 21 applies a uniform charge to the segment A as it thereafter rotates therepast. When the interframe sector, *a*, reaches the imaging station 23, the scan and illuminate control 196 provides a signal to drive motor 91 and to the lamp 65. The drive motor 91 effects the movement of the first carriage 59 and the second carriage 61 in the direction of arrow 81 in timed movement with the movement of the segment A on the electrostatic plate 11 past the aperture member 57, thereby projecting a light image of the master 25 onto the surface of the electrostatic plate 11. The electrostatic latent image thus produced is developed at the developing station 27 as the segment A rotates therepast. The transfer control 198 initiates the feeding of a support surface 29 in timed relation to the rotational movement of the segment A past the transfer station 31. The developed image on the sector A is transferred to the support surface 29 at the transfer station 31.

As the interframe sector, *a*, again rotates past the sensing device 13, it provides a signal to the frame counter which in turn provides a signal that is utilized by the logic depicted to cause the cleaning control 192 to deactuate the cleaning member 19 so that the cleaning member does not engage the surface of the electrostatic plate 11 as the segment A rotates therepast. Additionally, the charge control 194 causes the corona wires 47, 48 and 49 to be turned off as the interframe segment a rotates therepast. As segment A of the electrostatic plate 11 rotates past the imaging station 23, the signal is removed from the drive motor 91 thereby allowing the spring motor 97 to effect the return movement in the direction of arrow 99 of the first carriage 59 and the second carriage 61 of the moving optical projection system 33. The lamp 65 is turned off thereby insuring that the electrostatic image still remaining on the electrostatic plate 11 remains undisturbed. Thereafter, the segment A passes the developing station where the latent image is again developed and the transfer staion where the transfer control 198 effects the feeding of a second substrate surface 29 to receive the developed image. Continued rotation of the electrostatic plate 11 results in alternate imaging and redevelopment of the segment A.

The segment B of the electrostatic plate 11 which rotationally follows the segment A is imaged by the moving optical projection system during those revolutions of electrostatic plate 11 that the image on the segment A is redeveloped. In a similar manner, the segment B is redeveloped on those revolutions of the electrostatic plate during which the segment A is imaged or scanned. The segment C following the segment B is imaged and redeveloped in a manner identical to that of the segment A on any given revolution. As can readily be appreciated, for any given plate revolution except the first revolution, three copies of the master 25 are produced. When the requisite number of copies have been reproduced, the copy counter 163 provides a signal causing the reproduction apparatus to turn off.

It should be noted that FIG. 1 is a schematic illustration and is not drawn to scale. Thus, in actuality, the segment A is of a length equal to the length of travel of the moving optical projection system (assuming a 1:1 magnification ratio of the optical system). Additionally, the interframe segments are shown exaggerated in size for illustrative purposes. The interframe segment is not sufficiently large to allow return of the optical projection system as the interframe segment rotates therepast. In fact, with an assumed processing speed of 20 inches a second, and for the optical system depicted, the interframe segment must be approximately six times as large as the one required for corona and cleaning station switching in order to "hide" the flyback time of the optical system. Further, by utilizing a thicker photoconductive layer, the requisite charging area can be reduced thereby further diminishing the width of the intersegment gap.

While the present invention has been described with respect to an optical projection system incorporating moving mirror carriages, it will be understood that the invention is equally applicable to those projection systems utilizing rotational mirrors, travelling lenses, moving master document holders, and moving masters, each of which must be returned to an initial position prior to initiating a second image projection of the mounted master.

Further, as is understood by those skilled in the art, various charging, developing, transfer, and cleaning stations, per se, well known in the art could be utilized without departing from the spirit and scope of the present invention. Thus, for example, a cascade or screen-type development system could be utilized. The cleaning station could also incorporate an actuable preclean corona and/or erase lamp which are actuated in the same sequence as the cleaning member described. Further, it has been found that, when utilizing a wiper cleaning member, the latent image remains sufficiently undisturbed by the cleaning member to produce a limited number of high quality copies even though the cleaning member continuously remains in contact with the plate. Further, pressure and heat transfer techniques can be utilized, it being only important that the electrostatic image on the electrostatic plate be relatively undisturbed by the transfer operation.

While the invention has been particularly shown and described with reference to a preferred embodiment thereof, it should be understood by those skilled in the art that the foregoing and other changes in form and detail may be made therein without departing from the spirit and scope of the invention.

What is claimed is:

1. An electrostatic transfer reproduction apparatus incorporating an electrophotographic plate having at least one image area thereon which travels in a first direction in a closed loop past a plurality of processing stations comprising:

mounting means for mounting a master for optical projection;

an imaging processing station for projecting a light image of said mounted master onto said image area of said plate as said image area travels therepast creating a latent image on said image area, said imaging processing station including an actuable moving optical projecting system for projecting said light image while moving in said first direction from a home position, actuable drive means for moving said optical projection system in said first direction from said home position and for returning said optical projection system to said home position;

a developer processing station for applying electrostatically charged developer material onto said image area thereby developing said latent image whenever said image area travels therepast;

a transfer processing station for transferring each developed image from said image area onto a substrate when said image area travels therepast;

an actuable processing station actuable for removing a latent image on said image area as said image area travels therepast;

position sensing means for sensing the position of said at least one image area with respect to said processing stations;

cycle control means responsive to said sensing means for actuating said optical projection system and said drive means when said image area travels past said imaging processing station on a first pass thereby creating a latent image of the mounted master on said image area, for deactuating said actuable processing station and said optical projection system when said image area travels past said actuable processing staion and said imaging processing station on at least one next subsequent pass following said first pass thereby retaining said latent image created during said first pass and for actuating said actuable processing station and said optical projecting system and drive means when said image area travels past said actuable processing station and said imaging processing station following said at least one next subsequent pass thereby creating a further latent image of said mounted master on said image area, the latent image on said at least one image area being developed at said developer processing station and transferred at said transfer processing station at least two times before removal thereof at said actuable processing station.

2. The electrostatic transfer reproduction apparatus set forth in claim 1 wherein said electrophotographic plate having an odd number of image areas thereon and wherein said cycle control means alternately actuates and deactuates said actuable processing station and said optical projection system when an image area travels past said actuable processing station and said imaging processing station.

3. The electrophotographic transfer reproduction apparatus set forth in claim 2 wherein said electrostatic plate having an odd plural number of image areas thereon.

4. The electrostatic transfer reproduction apparatus set forth in claim 1 wherein said actuable processing station includes:

an actuable charging station for charging said image area of said electrophotographic plate when said image area travels therepast, said charging station being located prior to said imaging station in said first direction of plate travel;

said cycle control means actuating and deactuating said charging station in the same actuation-deactuation sequence applied to said optical projection system when the image area travels past said charging station.

5. The electrostatic transfer reproduction apparatus set forth in claim 1 wherein said actuatable processing station includes:

an actuable cleaning station for cleaning residual developer material from said image area of said plate when said image area travels therepast, said cleaning station being located prior to said imaging station in said first direction of plate travel;

said cycle control means actuating and deactuating said cleaning station in the same actuation-deactuation sequence applied to said optical projection system when the image area travels past said cleaning station.

6. The electrostatic transfer reproduction apparatus set forth in claim 1 wherein said drive means moves said optical projection system in a second direction opposite said first direction when returning said optical projection system to said home position;

at least one of said at least one image areas travelling past said imaging processing station during the movement of said optical projection system in said second direction.

7. The electrostatic transfer reproduction apparatus set forth in claim 6 wherein said electrophotographic plate having an odd number of image areas thereon and wherein said cycle control means alternately actuates and deactuates said actuable processing station and said optical projection system when an image area travels past said imaging processing station.

8. The electrostatic transfer reproduction apparatus set forth in claim 7 wherein said electrophotographic plate having an odd plural number of image areas thereon.

9. The electrostatic transfer reproduction apparatus set forth in claim 6 wherein said mounting means retains said master in a stationary position and wherein said optical projection system includes a movable carriage for scanning said mounted master.

* * * * *